(12) United States Patent
Hiratsu et al.

(10) Patent No.: US 6,835,250 B2
(45) Date of Patent: Dec. 28, 2004

(54) MAGNESIUM OXIDE PARTICLE AGGREGATE

(75) Inventors: Yutaka Hiratsu, Ako (JP); Toshio Kiyokawa, Ako (JP); Atsuo Toutsuka, Ako (JP)

(73) Assignee: Tateho Chemical Industries Co., Ltd. (JP)

( * ) Notice: Subject to any disclaimer, the term of this patent is extended or adjusted under 35 U.S.C. 154(b) by 185 days.

(21) Appl. No.: 10/258,954

(22) PCT Filed: Apr. 27, 2001

(86) PCT No.: PCT/JP01/03702

§ 371 (c)(1),
(2), (4) Date: Oct. 29, 2002

(87) PCT Pub. No.: WO01/83848

PCT Pub. Date: Nov. 8, 2001

(65) Prior Publication Data

US 2003/0136467 A1 Jul. 24, 2003

(30) Foreign Application Priority Data

May 1, 2000 (JP) ......................... 2000-132370

(51) Int. Cl.[7] .............................................. B23K 35/24
(52) U.S. Cl. .................... 148/27; 148/113; 423/583; 423/635; 501/108; 502/340
(58) Field of Search .................... 148/27, 113; 423/583, 423/635; 501/108; 502/340

(56) References Cited

U.S. PATENT DOCUMENTS 3,930,906 A  *  1/1976  Irie et al. ..................... 148/308

FOREIGN PATENT DOCUMENTS

| JP | 3115585 | 5/1991 |
| JP | 1046259 | 2/1998 |
| JP | 11181525 | 7/1999 |

OTHER PUBLICATIONS

Abstract of 10–46259 (2/98) patent (English).
Abstract of 11–181525 (7/99) of patent (English).
Abstract of 3–115585 (7/99) of patent (English).

* cited by examiner

*Primary Examiner*—John P. Sheehan
(74) *Attorney, Agent, or Firm*—Muserlian, Lucas and Mercanti

(57) ABSTRACT

An object of the present invention is to provide a magnesium oxide particle aggregate having a controlled particle aggregation structure so that the solid phase-solid phase reaction between magnesium oxide and the $SiO_2$ film on the surface can be appropriately controlled. The object can be achieved by a magnesium oxide particle aggregate characterized in that a first inflection point diameter is $0.30 \times 10^{-6}$ m or less, an interparticle void volume is $1.40 \times 10^{-3}$ to $2.20 \times 10^{-3}$ $m^3/kg$ and a particle void volume is $0.55 \times 10^{-3}$ to $0.80 \times 10^{-3}$ $m^3/kg$ in a cumulative intrusion volume curve of the particle aggregate.

1 Claim, 3 Drawing Sheets

MAGNESIUM OXIDE PARTICLE AGGREGATE

This application is a 371 of PCT/JP01/03702 filed Apr. 27, 2001.

FIELD OF THE INVENTION

The present invention relates to a magnesium oxide particle aggregate having a controlled particle aggregation structure. More particularly, the present invention relates to a magnesium oxide particle aggregate used as an annealing separator to form a forsterite film which imparts excellent insulation properties and magnetic properties to a grain-oriented magnetic steel sheet.

BACKGROUND ART

Grain-oriented magnetic steel sheets used in transformers or generators are generally produced by a process in which silicon steel containing about 3% of Si is hot-rolled, subsequently cold-rolled so as to have a final sheet thickness, and then subjected to decarburization annealing (primary recrystallization annealing), followed by finishing annealing. In this process, for imparting insulation properties to a magnetic steel sheet, after the decarburization annealing and before the final finishing annealing, a slurry containing magnesium oxide is applied to a surface of the steel sheet and then dried, and wound into a coil form. Si contained in the silicon steel reacts with oxygen during the decarburization annealing to form a $SiO_2$ film on the surface of the steel sheet. $SiO_2$ in the film then reacts with magnesium oxide in the slurry during the finishing annealing to form a forsterite ($Mg_2SiO_4$) film having excellent insulation properties on the surface of the steel sheet. The forsterite film is considered to impart not only insulation properties but also a tension to the surface thereof due to the difference in the coefficient of thermal expansion between the forsterite film and the steel sheet, thus lowering core loss of the grain-oriented magnetic steel sheet to improve the magnetic properties.

Therefore, the forsterite film plays an extremely important role in the production of grain-oriented magnetic steel sheets, and hence the properties of magnesium oxide forming the forsterite film directly affect the magnetic properties thereof. For this reason, there have conventionally been demands for magnesium oxide used as an annealing separator to meet the requirements of excellent properties and resultant precise control. In view of this, a number of inventions have been made with respect to the magnesium oxide used as an annealing separator.

One example of such inventions is to add an additive to magnesium oxide or to control an impurity content thereof. For example, with respect to magnesium oxide utilizing an additive, Japanese Patent Publication No. 45322/1995 (process for producing a magnesium oxide composition) discloses a process for producing magnesium oxide, in which a predetermined amount of a boron compound is added to Mg (OH)$_2$ containing chlorine and then calcined under a predetermined steam partial pressure.

On the other hand, many inventions in respect of the activity determined by the reaction rate between magnesium oxide particles and an acid, i.e., citric acid activity (CAA) are also disclosed. CAA is represented by a period of time required until a 0.4 N aqueous solution of citric acid at a predetermined temperature (for example, 22° C. or 30° C.) containing phenolphthalein as an indicator becomes neutral from a point in time when a final reactive equivalent amount of magnesium oxide is added to the solution and stirred. It is empirically known that CAA can be used as an index for evaluation of the magnesium oxide used as an annealing separator for the grain-oriented magnetic steel sheet.

As an invention in respect of the distribution of CAA at a reactive equivalent amount of magnesium oxide, Japanese Prov. Patent Publication No. 58331/1980 discloses an invention of magnesium oxide for an annealing separator having an activity adjusted so that the distribution of CAA is controlled in a narrow range for each final reaction rate of 20%, 40%, 60% and 70%, respectively. In addition, Japanese Prov. Patent Publication Nos. 33138/1994 and 158558/1999 disclose an invention of magnesium oxide for an annealing separator, in which the activity of CAA of 40% or 80%, the particle diameter and the specific surface area are restricted to respectively predetermined values. Further, Japanese Prov. Patent Publication No. 269555/1999 discloses an invention of an annealing separator for grain-oriented magnetic steel sheets, in which CAA of 70%, the ratio of CAA of 70% to CAA of 40%, the particle diameter, the specific surface area and the like are restricted to predetermined values, respectively. In each of the above inventions, the hydration property and the reactivity of the magnesium oxide particles are controlled.

The activity of magnesium oxide indicated by CAA is a yardstick for the reactivity in the solid phase-liquid phase reaction between magnesium oxide and citric acid. In this solid phase-liquid phase reaction, the larger the number of reactive sites in the solid phase, that is, the smaller the particle diameter of magnesium oxide or the larger the specific surface area thereof, the larger the surface free energy to increase the activity.

However, in powder particles including magnesium oxide particles produced by various methods, oxide particles can be existed in the form of particle aggregate in which several powder particles are bound together and agglomerated in addition to the case existed in the form of individual particle. In the particle aggregate caused by agglomeration or aggregation, the CAA measured is not a value reflecting the structure of the particle aggregate and therefore cannot precisely represent the reactivity of an annealing separator.

Further, CAA merely simulates empirically the reactivity in the solid phase-solid phase reaction, which actually proceeds between $SiO_2$ and magnesium oxide on the surface of the magnetic steel sheet, using the solid phase-liquid phase reaction between magnesium oxide and citric acid. Differing from the solid phase-liquid phase reaction, in the forsterite formation reaction which is a solid phase-solid phase reaction, the particle aggregation structure of magnesium oxide, for example, the number of contact points between the $SiO_2$ film and the magnesium oxide particles, is presumed to remarkably affect the reactivity. Specifically, even when the magnesium oxide particles have active surfaces, a small number of contact points derived from the particle aggregation structure cause the reaction to proceed unsatisfactorily. On the other hand, even when magnesium oxide particles have inactive surfaces, an increased number of contact points can advance the reaction satisfactorily.

As mentioned above, CAA used as an index of the properties of an annealing separator for the magnetic steel sheet is a yardstick for evaluation of the reactivity of magnesium oxide only under given conditions. It is considered that CAA dose not necessarily precisely evaluate the solid phase-solid phase reaction which actually proceeds on the surface of the magnetic steel sheet. Therefore, in magnesium oxide having a poor activity evaluated by CAA, there is a possibility that magnesium oxide having a particle aggregation structure suitable for an annealing separator can be found by using a method of controlling the solid phase-solid phase reaction taking into consideration the aggregation structure of powder particles.

In view of the above, an object of the present invention is to provide a magnesium oxide particle aggregate having a controlled particle aggregation structure so that the solid phase-solid phase reaction between magnesium oxide and the $SiO_2$ film on the surface can be appropriately controlled. An object of the present invention is further to provide an annealing separator for a grain-oriented magnetic steel sheet, using the magnesium oxide particle aggregate of the present invention, and to provide a grain-oriented magnetic steel sheet obtainable by a treatment using the annealing separator of the present invention.

DISCLOSURE OF THE INVENTION

The present inventors have conducted extensive and intensive studies to solve the above-mentioned problems and thus completed the present invention. Specifically, the present invention is a magnesium oxide particle aggregate characterized in that, in a cumulative intrusion volume curve of particles, a first inflection point diameter is $0.30 \times 10^{-6}$ m or less, an interparticle void volume is $1.40 \times 10^{-3}$ to $2.20 \times 10^{-3}$ m$^3$/kg and a particle void volume is $0.55 \times 10^{-3}$ to $0.80 \times 10^{-3}$ m$^3$/kg.

In addition, the present invention is an annealing separator for a grain-oriented magnetic steel sheet, using the magnesium oxide particle aggregate having the above particle aggregation structure.

Further, the present invention is a grain-oriented magnetic steel sheet obtainable by a treatment using the above annealing separator.

In the present invention, a cumulative intrusion volume curve of particles means a curve which shows a relationship between a pore diameter and a cumulative pore volume determined from a pore distribution measurement by mercury porosimetry. FIG. 1 shows two cumulative intrusion volume curves of different types of magnesium oxide particle aggregates having different particle aggregation structures. A first inflection point is an inflection point at the largest pore diameter among inflection points at which the cumulative intrusion volume curve suddenly rises. It is indicated by a solid circle in the figure. A first inflection point diameter means a pore diameter at the first inflection point. An interparticle void volume means a cumulative pore volume at the first inflection point. A particle void volume means a volume obtained by subtracting the cumulative pore volume at the first inflection point from the total pore volume.

BEST MODE FOR CARRYING OUT THE INVENTION

The present inventors have made studies on the solid phase-solid phase reaction between magnesium oxide and silica ($SiO_2$), which reaction proceeds on a surface of a grain-oriented magnetic steel sheet, from the viewpoint of the particle aggregation structure. As a result, they have found that a first inflection point diameter, a particle void volume and an interparticle void volume, in a cumulative intrusion volume curve determined by a pore distribution measurement using mercury porosimetry, can be used as indices for precisely indicating the structure of a magnesium oxide particle aggregate. Based on the above finding, these indices are controlled so as to fall in respective appropriate ranges to create a magnesium oxide particle aggregate which can appropriately control a number of contact points in the solid phase reaction so that the magnesium oxide particle aggregate is surely reacted with the $SiO_2$ film formed on the surface of the grain-oriented magnetic steel sheet to form forsterite. The magnesium oxide particle aggregate having a controlled particle aggregation structure exhibits an appropriate reaction rate of the forsterite formation and forms a large amount of forsterite, and further can form a forsterite film having good adhesion.

The pore distribution measurement by mercury porosimetry for obtaining indices indicating the particle aggregation structure was conducted by the following method. The method for the pore distribution measurement by mercury porosimetry is well known as an analysis method for obtaining data of a pore distribution of powder and thus data of a particle aggregation structure.

As a mercury porosimeter, AutoPore 9410, manufactured by Micromeritics GbmH, was used. A measurement cell for powder sample having a cell capacity of $5 \times 10^{-6}$ m$^3$ and a stem capacity of $0.38 \times 10^{-6}$ m$^3$ was used. A sample to be measured was preliminarily passed through a 330 mesh standard sieve (JIS-R8801-87) and then precisely weighed in the range of from $0.10 \times 10^{-3}$ to $0.13 \times 10^{-3}$ kg, and placed in the measurement cell. The cell was set in the porosimeter, and then the inside of the cell was maintained in a reduced pressure of 50 $\mu$Hg (6.67 Pa) or less for 20 minutes. Next, mercury was charged into the measurement cell until the pressure in the cell became 1.5 Pisa (10,342 Pa). Then, the mercury was pressed under a pressure in the range of from 2 Pisa (13,790 Pa) to 60,000 Pisa (413.7 MPa) to measure a pore distribution. As the mercury for the measurement, a special grade mercury reagent having a purity of 99.5 mass % or higher was used, and the density of the mercury used was $13.5335 \times 10^3$ kg/m$^3$.

Figure 1:
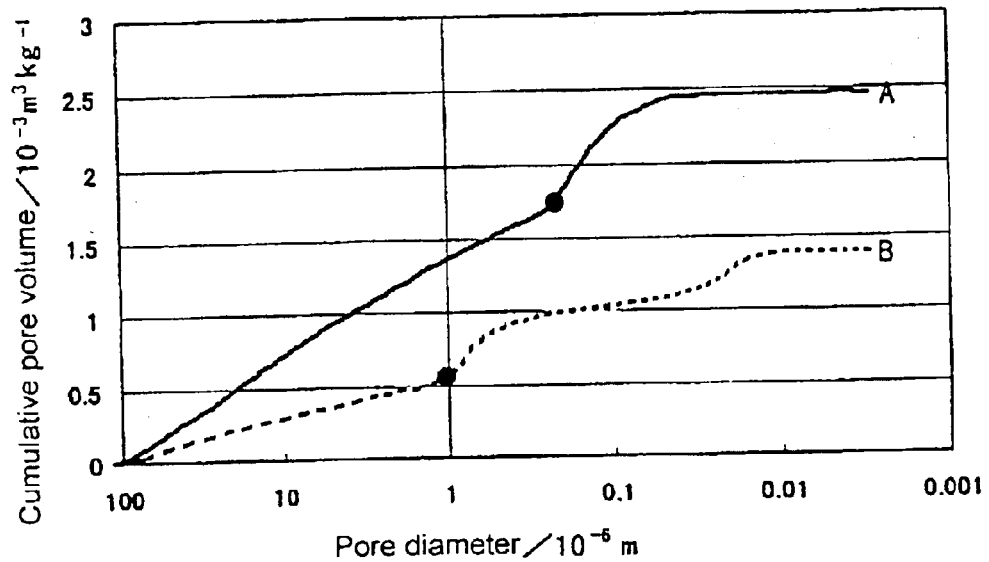
FIG. 1 is graphs showing examples of cumulative intrusion volume curves of particle aggregates comprised mainly of magnesium oxide, determined from a pore distribution measurement by mercury porosimetry.

The data obtained from the pore distribution measurement by mercury porosimetry was plotted on a graph in which a pore diameter determined from the mercury pressing pressure was taken as an abscissa and a cumulative pore volume as an ordinate, so that a cumulative intrusion volume curve shown in FIG. 1 was obtained. The mercury pressing pressure is converted to a pore diameter using the following formula (I)(Washburn's equation).

$$D = -(1/P) \times 4\gamma \times \cos\phi \quad \text{(I)}$$

wherein D: pore diameter (m);
P: pressure (Pa);
γ: surface tension of mercury {485 dyne/cm (0.485 Pa·m)}; and
φ: contact angle of mercury (130°=2.26893 rad).

A first inflection point diameter, a particle void volume and an interparticle void volume were individually determined from the cumulative intrusion volume curve as follows.

In the cumulative intrusion volume curve of FIG. 1, a cumulative pore volume on the ordinate indicates a cumulative value of a pore volume in a particle aggregate per unit weight determined from larger pores successively. An inflection point is a point at which the cumulative intrusion volume curve suddenly rises. The number of inflection point is not necessarily one, and there is a case where a plurality of inflection points are present depending on a sample to be measured, as can be seen in curve B in FIG. 1. The inflection point at the largest pore diameter is thus taken as a first inflection point. A first inflection point diameter is the pore diameter at the first inflection point. An interparticle void volume is a void volume between the aggregate particles. It is represented by the cumulative pore volume at the first inflection point. A particle void volume is a void volume which is present in the particles and smaller than the diameter of the aggregate particles. It is represented by the volume value obtained by subtracting the cumulative pore volume at the first inflection point from the total pore volume.

The relationship between each of the first inflection, the interparticle void volume and the particle void volume point in a cumulative intrusion volume curve and the particle aggregation structure of the particle aggregate is presumed as follows.

Powder particle generally constitute an aggregate particle by aggregation of a plurality of the smallest unit particles (primary particles), each of which is presumed to be a single particle. The aggregation structures of powder include a simple particle structure such that primary particles merely agglomerate and a complicated particle structure such that secondary aggregates formed by aggregation of primary particles further agglomerate to form a larger tertiary aggregation structure. Particle aggregation may be occurred by various reasons, for example, aggregation caused by surface charges of particles dispersed in a liquid, deposition of the ingredients dissolved during drying, electrostatic charge in a dry state, a physical stress during grinding or grain boundary growth during calcination. Thus, powder frequently has a characteristic ordered particle structure depending on types or conditions of production processes and qualities of raw materials.

When taking such a particle structure into consideration, the first inflection point diameter indicates a size of the largest ordered aggregation structure among these ordered aggregation structures. The particle void volume is a volume of a pore smaller than the aggregate particles, and it is an index of the density of the aggregate particles. The interparticle void volume is a void volume between the aggregate particles in a state such that the aggregate particles are in contact with one another. The void volume between the aggregate particles in contact with one another increases as the unevenness of the surface of the aggregate particles becomes larger. Therefore, the interparticle void volume can be used as a material property value indirectly indicating the form of the aggregate particles. Thus, each of the first inflection point diameter indicating a size of the ordered aggregate particle structure, the particle void volume indicating the density of the aggregate particles and the interparticle void volume indirectly indicating the form of the aggregate particles is a suitable material factor for indicating the complicated aggregate particle structure. Therefore, in the powder comprised of a homogeneous material, for example, magnesium oxide, the particle aggregation structure can be controlled so as to achieve predetermined values by appropriately selecting the production conditions for the powder.

When pressing mercury into a particle aggregate having the above particle structure, mercury first penetrates into the voids between the particles. In this instance, as the mercury pressing pressure increases, that is, the pore diameter determined from the mercury pressing pressure decreases, the cumulative pore volume increases with a substantially constant gradient. After all voids between the particles are filled with mercury, mercury starts penetrating into the voids in the particles. A great number of voids having the same size are present in the particles, and the sum of the voids in the particles are large. Therefore, when the penetration of mercury is changed from the voids between the particles to the voids in the particles, the cumulative pore volume drastically increases even as the mercury pressing pressure slightly increases. In other words, the pore diameter at which the cumulative pore volume drastically increases is presumed to correspond to the first inflection point diameter which is the maximum value for the aggregate unit structure in the particle aggregate.

The particle void volume is a volume determined by subtracting the cumulative pore volume at the first inflection point from the total pore volume. The total pore volume is deemed a cumulative pore volume at a pore diameter of $0.003 \times 10^{-6}$ m. This is because the particle structure is changed due to the pressing pressure in the pore distribution measurement by mercury porosimetry, and therefore, the measurement error can be minimized by using the cumulative pore volume at the maximum mercury pressing pressure as a total pore volume.

Next, magnesium oxide particle aggregates having different particle aggregation structures in which each of the first inflection point diameter, the particle void volume and the interparticle void volume, in a cumulative intrusion volume curve, are individually different were prepared to examine the reaction rate of the solid phase reaction between the individual magnesium oxide particle aggregates and silica.

The magnesium oxide particle aggregate was prepared using magnesium chloride as a raw material, and calcium hydroxide was added to an aqueous solution of magnesium chloride to effect a reaction, thus forming magnesium hydroxide. Then, the magnesium hydroxide was subjected to filtration by means of a filter press, and washed with water and dried, and then calcined using a rotary kiln to form magnesium oxide. The calcined magnesium oxide was ground.

The preparation of the magnesium oxide particle aggregate is not limited to the above-mentioned method. A number of methods for preparation can be employed, for example, a method in which an alkaline aqueous solution such as an aqueous solution of calcium hydroxide, sodium hydroxide or potassium hydroxide is reacted with a magnesium chloride-containing aqueous solution such as bittern, brackish water or sea water, to obtain magnesium hydroxide, and then the magnesium hydroxide is calcined to obtain a magnesium oxide particle aggregate; a method in which magnesite is calcined to obtain a magnesium oxide particle aggregate; a method in which a magnesium oxide particle aggregate is directly obtained from a magnesium chloride-containing aqueous solution by an amalgamation method; and a method in which magnesium oxide obtained by the above-mentioned method is subjected to hydration to form magnesium hydroxide, followed by calcination, to obtain a magnesium oxide particle aggregate. By appropriately selecting conditions for the individual steps, the particle structure can be controlled.

The first inflection point diameter and the particle void volume of the magnesium oxide particle aggregate were adjusted by controlling the particle structure of magnesium hydroxide which is a precursor of magnesium oxide under the below-described conditions. On the other hand, the interparticle void volume was adjusted by controlling the below-described grinding conditions. In the present invention, for elucidating the effect of the magnesium oxide particle aggregation structure on the reaction rate of the forsterite solid phase reaction, the temperature for calcination of magnesium hydroxide by means of a rotary kiln was set to 800 to 1,000° C. so that CAA of 40% at a final reaction rate at 22° C. was within the range of from 120 to 140.

On the other hand, in the solid phase-solid phase reaction between magnesium oxide and silica ($SiO_2$), these were directly reacted with each other to form forsterite. Specifically, the magnesium oxide particle aggregate prepared by the above-mentioned method and amorphous silica was mixed in a molar ratio of 2:1 to form a mixture. The mixture was then shaped under a pressure of 50 MPa to obtain a shaped article having a diameter of $15 \times 10^{-3}$ m and a height of $15 \times 10^{-3}$ m. The shaped article was then calcined in a nitrogen gas atmosphere at 1,200° C. for 4 hours. An X-ray diffraction analysis was conducted to quantitatively determine a forsterite formation rate in the sintered product obtained by the process.

Figure 2:
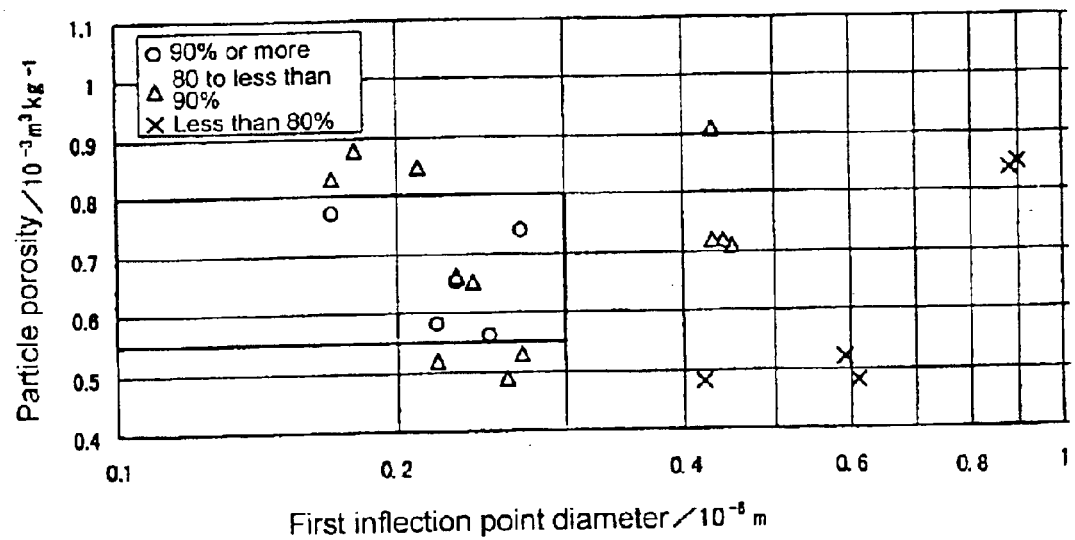
FIG. 2 is a graph showing a relationship between a forsterite formation rate, a first inflection point diameter and a particle void volume with respect to various MgO particle aggregates.
Figure 3:
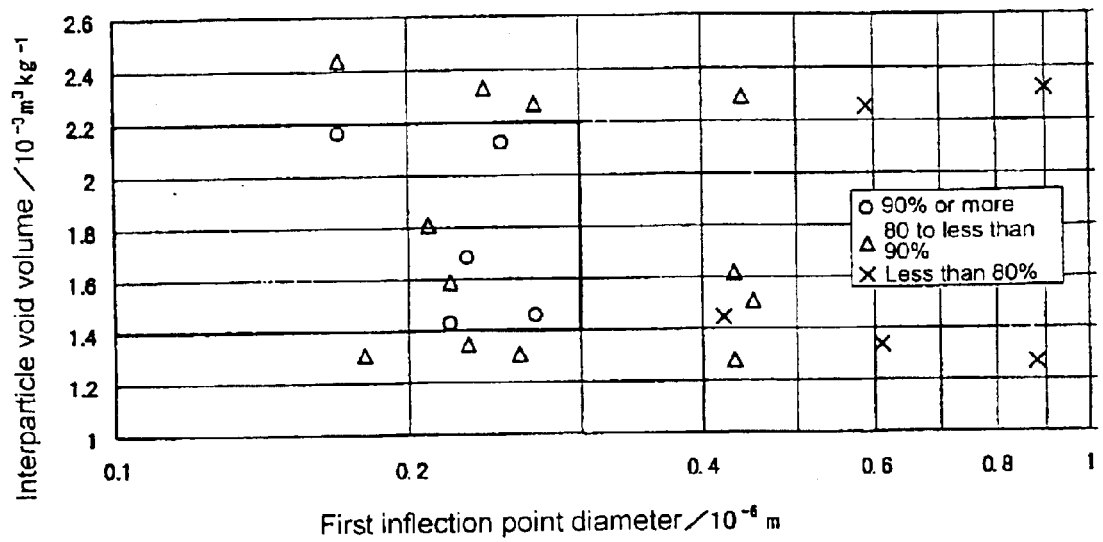
FIG. 3 is a graph showing a relationship between a forsterite formation rate, a first inflection point diameter and an interparticle void volume with respect to various MgO particle aggregates.
Figure 4:
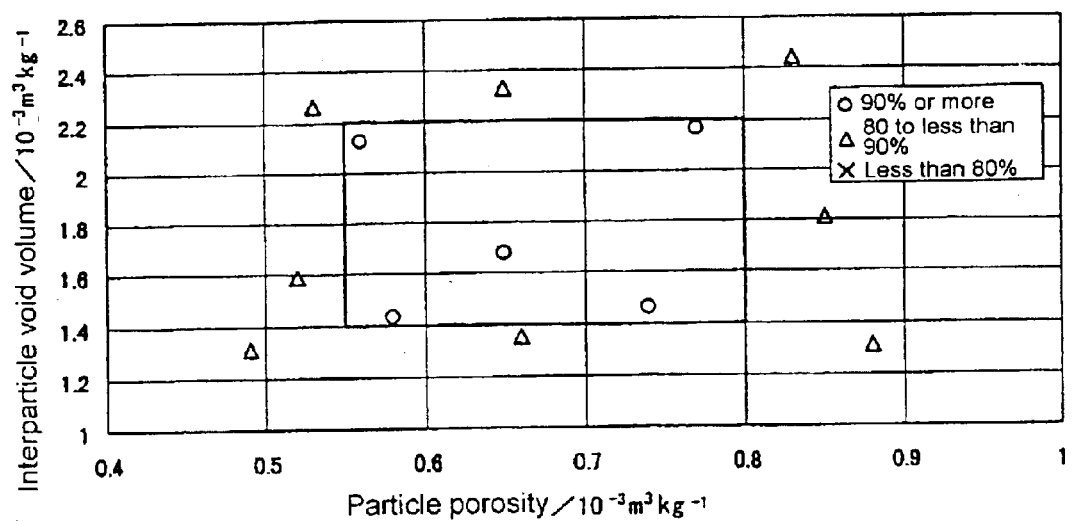
FIG. 4 is a graph showing a relationship between a particle void volume and an interparticle void volume with respect to the particle aggregate having a first inflection point diameter of $0.30 \times 10^{-6}$ m or less.

Table 1 shows index values for the particle aggregation structure and forsterite formation rate for 22 samples measured. FIG. 2 shows a relationship between a forsterite formation rate, the first inflection point diameter and a particle void volume. FIG. 3 shows a relationship between a forsterite formation rate, a first inflection point diameter and an interparticle void volume. FIG. 4 further shows a relationship between a particle void volume and an interparticle void volume with respect to the particle aggregate having the first inflection point diameter of $0.30 \times 10^{-6}$ m or less. In the figures, the forsterite formation rate is indicated by classifying into three levels, i.e., 90% or more, 80 to less than 90%, and less than 80%.

TABLE 1

| Sample | First inflection point diameter $10^{-6}$ m | Particle porosity $10^{-3}$ m$^3$ kg$^{-1}$ | Interparticle void volume $10^{-3}$ m$^3$ kg$^{-1}$ | Forsterite formation rate % |
|---|---|---|---|---|
| A | 0.17 | 0.77 | 2.16 | 91.3 |
| B | 0.18 | 0.88 | 1.31 | 86.2 |
| C | 0.17 | 0.83 | 2.44 | 84.7 |
| D | 0.23 | 0.65 | 1.68 | 91.9 |
| E | 0.23 | 0.66 | 1.35 | 89.7 |
| F | 0.24 | 0.65 | 2.33 | 86.5 |
| G | 0.21 | 0.85 | 1.81 | 89.5 |
| H | 0.22 | 0.58 | 1.43 | 90.5 |
| I | 0.25 | 0.56 | 2.12 | 90.1 |
| J | 0.22 | 0.52 | 1.59 | 86.8 |
| K | 0.27 | 0.74 | 1.46 | 91.8 |
| L | 0.26 | 0.49 | 1.31 | 81.2 |
| M | 0.27 | 0.53 | 2.27 | 82.1 |
| N | 0.45 | 0.71 | 1.51 | 87.2 |
| O | 0.43 | 0.72 | 1.28 | 84.9 |

TABLE 1-continued

| Sample | First inflection point diameter $10^{-6}$ m | Particle porosity $10^{-3}$ m$^3$ kg$^{-1}$ | Interparticle void volume $10^{-3}$ m$^3$ kg$^{-1}$ | Forsterite formation rate % |
|---|---|---|---|---|
| P | 0.44 | 0.72 | 2.29 | 83.6 |
| Q | 0.43 | 0.91 | 1.62 | 81.0 |
| R | 0.42 | 0.48 | 1.45 | 78.8 |
| S | 0.59 | 0.52 | 2.25 | 77.0 |
| T | 0.61 | 0.48 | 1.34 | 75.5 |
| U | 0.88 | 0.84 | 1.27 | 77.7 |
| V | 0.90 | 0.85 | 2.32 | 75.6 |

For stably achieving a forsterite formation rate of 90% or more, as can be seen from FIG. 2, it is necessary that the first inflection point diameter be $0.30 \times 10^{-6}$ m or less and the particle void volume be within the range of from $0.55 \times 10^{-3}$ to $0.80 \times 10^{-3}$ m$^3$/kg, and, as can be seen from FIG. 3, it is necessary that the first inflection point diameter be $0.30 \times 10^{-6}$ m or less and the interparticle void volume be within the range of from $1.40 \times 10^{-3}$ to $2.20 \times 10^{-3}$ m$^3$/kg. Here, the forsterite formation rate of 90% or more was taken as a reference value. When the forsterite formation rate can satisfy such a reference value, the reactivity in the solid phase reaction between the magnesium oxide particle aggregate and the film comprised mainly of silica formed on the surface of the steel sheet is high, and the film having excellent adhesion properties can be formed in the forsterite formation reaction.

From the results shown in FIGS. 2 and 3, since the smaller the first inflection point diameter, the higher the reactivity of the particle aggregate, and therefore, it is an essential feature that the first inflection point diameter is as small as possible. However, by meeting only the requirement that the first inflection point diameter be $0.30 \times 10^{-6}$ m or less, forsterite cannot be stably obtained in a formation rate of 90% or more. Specifically, in solid phase-solid phase reaction of the forsterite formation, the number of contact points between the magnesium oxide particles and the silica particles or the silica film determines the rate of the solid phase reaction, and hence optimization of the number of the above contact points is needed. The numbers of the contact points depend on the interparticle void volume and the particle void volume of the particle aggregate. As shown in FIG. 4, the particle aggregate must have a particle aggregation structure which satisfies the requirement that the first inflection point diameter be $0.30 \times 10^{-6}$ m or less, the interparticle void volume be within the range of from $1.40 \times 10^{-3}$ to $2.20 \times 10^{-3}$ m$^3$/kg and the particle void volume be within the range of from $0.55 \times 10^{-3}$ to $0.80 \times 10^{-3}$ m$^3$/kg.

Next, a magnesium oxide particle aggregate having a first inflection point diameter, an interparticle void volume and a particle void volume, each being in the above-mentioned appropriate range, can be prepared as follows. It is noted that the preparation method described below is merely an example, and a magnesium oxide particle aggregate having the particle aggregation structure defined in the present invention can be prepared by other methods.

The first inflection point diameter and the particle void volume of the magnesium oxide particle aggregate are adjusted by controlling the particle structure of magnesium hydroxide which is a precursor of magnesium oxide. Specifically, a calcium hydroxide slurry is added to a magnesium chloride solution so that the resultant magnesium hydroxide concentration becomes a predetermined value, and the resultant mixture is stirred to effect a reaction at a predetermined temperature for a predetermined time, and then, the reaction mixture is subjected to filtration by means of a filter press, washed with water and dried to form magnesium hydroxide.

Figure 5:
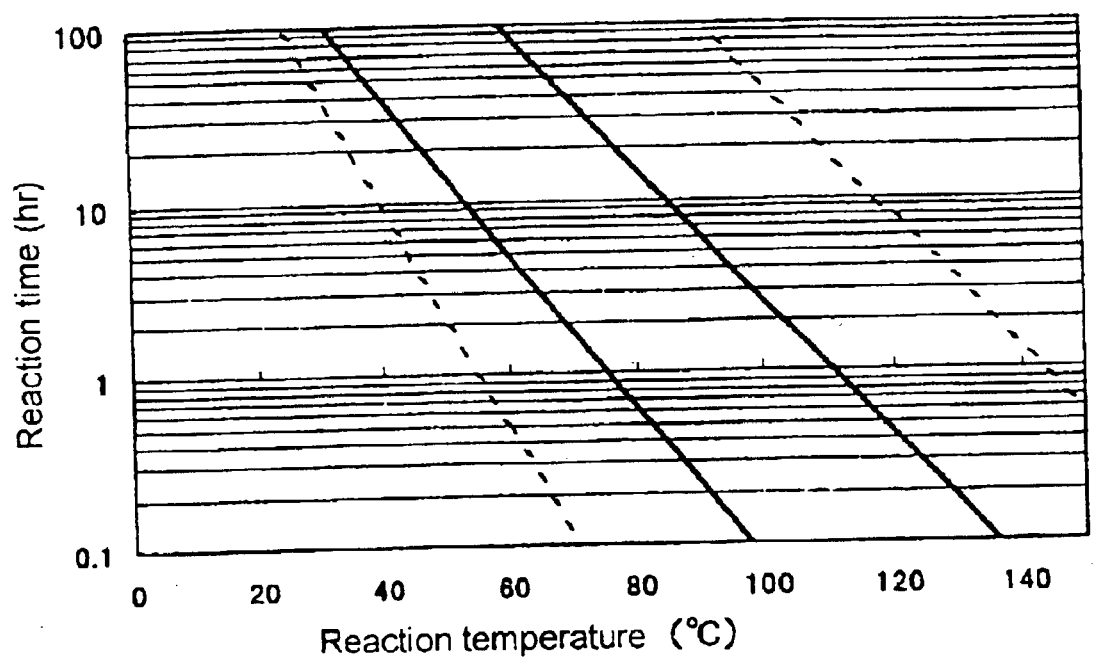
FIG. 5 is graphs showing temperature and time conditions suitable for controlling the reaction so that the first inflection point diameter becomes $0.30 \times 10^{-6}$ m or less when magnesium hydroxide is prepared by reacting an aqueous solution of magnesium chloride with calcium hydroxide.

For adjusting the first inflection point diameter to be $0.30 \times 10^{-6}$ m or less, as shown in FIG. 5, magnesium hydroxide is formed by a reaction under conditions such that the reaction temperature (T, °C.) and the reaction time (t, hr) satisfy the relationship represented by the following formula (II).

$$3{,}230\ \mathrm{epx}(-0.1476\,T) \leq t \leq 217{,}000\ \mathrm{epx}(-0.0855\,T) \qquad \text{(II)}$$

When the reaction time exceeds 217,000 epx(−0.0855 T), the first inflection point diameter becomes more than $0.30 \times 10^{-6}$ m, result in too large aggregate particles. On the other hand, the reaction time is less than 3,230 epx(−0.1476 T), the reaction of magnesium hydroxide formation does not proceeds satisfactorily. It is more preferred that the reaction temperature (T, °C.) and the reaction time (t, hr) satisfy the relationship represented by the following formula (III).

$$2{,}350\ \mathrm{epx}(-0.103\,T) \leq t \leq 20{,}000\ \mathrm{epx}(-0.0896\,T) \qquad \text{(III)}$$

For adjusting the particle void volume to be within the range of from $0.55 \times 10^{-3}$ to $0.80 \times 10^{-3}$ m$^3$/kg, the ratio between the magnesium chloride solution and the calcium hydroxide slurry mixed is adjusted so that the magnesium hydroxide concentration after the reaction becomes 0.2 to 4.5 mol/kg, preferably 0.5 to 3 mol/kg. When the magnesium hydroxide concentration after the reaction is less than 0.2 mol/kg, a particle aggregate having such a low density that the particle void volume is more than $0.80 \times 10^{-3}$ m$^3$/kg is disadvantageously formed. On the other hand, when the magnesium hydroxide concentration after the reaction exceeds 4.5 mol/kg, a particle aggregate having too high a density such that the particle void volume is less than $0.55 \times 10^{-3}$ m$^3$/kg is disadvantageously formed.

In the reaction of forming magnesium hydroxide, a flocculant can be added for promoting the aggregation reaction, and a flocculation preventing agent can be added for preventing the aggregation reaction from proceeding to an excess extent. Examples of flocculants include aluminum sulfate, polyaluminum chloride, iron sulfate and polyacrylamide, and preferred are polyaluminum chloride and anionic polyacrylamide. The flocculant can be added in an amount of 1 to 1,000 ppm, preferably 5 to 500 ppm, more preferably 10 to 100 ppm, based on the total mass of the magnesium chloride solution and the calcium hydroxide slurry. It is not preferred to add a flocculant in an excess amount since a particle aggregate having too high a density such that the particle void volume is less than $0.55 \times 10^{-3}$ m$^3$/kg is disadvantageously formed.

On the other hand, as a flocculation preventing agent, sodium silicate, sodium polyphosphate, sodium hexametaphosphate, a nonionic surfactant or an anionic surfactant can be added, and preferred are sodium silicate, sodium hexametaphosphate and nonionic surfactants. The flocculation preventing agent can be added in an amount of 1 to 1,000 ppm, preferably 5 to 500 ppm, more preferably 10 to 100 ppm, based on the total mass of the magnesium chloride solution and the calcium hydroxide slurry. It is not preferred to add a flocculation preventing agent in an excess amount since a particle aggregate having such a low density that the particle void volume is more than $0.88 \times 10^{-3}$ m$^3$/kg is disadvantageously formed.

The stirring was conducted at a stirring rate of 350 to 450 rpm. The stirring does not largely affect the particle structure, but the interparticle void volume can be increased by stirring at a high speed and at a high shear rate by means of, for example, a homogenizer during the reaction or can be lowered by almost no stirring.

Next, the thus formed magnesium hydroxide precursor is calcined by means of a rotary kiln to form a magnesium oxide particle aggregate. In this case, the calcination temperature may be 800 to 1,000° C., preferably 850 to 950° C. The calcination time may be 0.2 to 4 hours, preferably 0.5 to 2 hours.

Further, the obtained magnesium oxide particle aggregate is ground using a hammer mill grinder at a power of 5.5 kW having a classifier. For obtaining a particle aggregate having the interparticle void volume in the range of from $1.40 \times 10^{-3}$ to $2.20 \times 10^{-3}$ m$^3$/kg, the hammer rotational frequency may be 2,800 to 4,200 rpm, especially preferably 3,200 to 3,800 rpm. When the hammer rotational frequency is less than 2,800 rpm, the resultant particle structure has too high a density and a desired interparticle void volume cannot be obtained. On the other hand, the rotational frequency of the classifier is preferably 2,200 to 4,800 rpm, more preferably 2,800 to 4,200 rpm. When the classifier rotational frequency exceeds 5,000 rpm, the resultant particle structure has a low density and a desired interparticle void volume cannot be obtained.

As a grinder, a hammer mill grinder, a high-speed rotating mill grinder, a jet mill grinder, a roller mill grinder or a ball mill grinder can be used. The optimal conditions of the grinder for obtaining the interparticle void volume which falls in the range defined in the present invention vary depending on the system and ability (power) of the grinder used, but too strong grinding increases the interparticle void volume and too weak grinding lowers the interparticle void volume. In the jet mill grinder in which the impact energy applied during grinding is large, the impact energy may lower the particle void volume, and therefore the operation of the grinder of this type is needed to be controlled under conditions suitable for the apparatus. Further, a classifier is not necessarily used, but the use of a classifier makes it possible to control the grinding conditions more flexibly.

Next, using the thus obtained magnesium oxide, an annealing separator for a grain-oriented magnetic steel sheet and a grain-oriented magnetic steel sheet are produced as follows.

A grain-oriented magnetic steel sheet is produced as follows. A silicon steel slab having an Si content of 2.5 to 4.5% is hot-rolled, then pickled with an acid, followed by cold rolling or cold rolling-intermediate annealing-cold rolling so that the resultant sheet has a predetermined thickness. Then, the cold-rolled coil is subjected to recrystallization annealing, which also effects decarburization, in a wet hydrogen gas atmosphere at 700 to 900° C. to form an oxide film comprised mainly of silica ($SiO_2$) on the surface of the steel sheet. An aqueous slurry obtained by uniformly dispersing in water the magnesium oxide particle aggregate having the particle aggregation structure of the present invention prepared by the above method is continuously applied onto the resultant steel sheet using a roll coater or a spray, and dried at about 300° C. The thus treated steel sheet coil is subjected to final finishing annealing, for example, at 1,200° C. for 20 hours to form forsterite ($Mg_2SiO_4$) on the surface of the steel sheet. The forsterite imparts a tension to the surface thereof along with the insulating film to improve core loss of the grain-oriented magnetic steel sheet.

As described in, for example, Japanese Prov. Patent Publication No. 101059/1994, for facilitating the forsterite film formation, a known reaction accelerator, inhibitor auxiliary or tension-imparting insulating film additive can be added to the annealing separator.

EXAMPLES

Next, the present invention will be described in more detail with reference to the following Examples.

Example 1

Magnecite ore was calcined by means of a rotary kiln at 850° C. for 1 hour and ground by means of a cage mill grinder to form magnesium oxide. For controlling the particle structure, the magnesium oxide was added to water so that the magnesium hydroxide concentration after reaction became 3 mol/kg, and the resultant mixture was stirred at 400 rpm to effect a reaction at 85 to 95° C. for 2 hours, thus forming magnesium hydroxide as a precursor. The magnesium hydroxide was subjected to filtration by means of a filter press, and washed with water and dried, and then the resultant magnesium hydroxide was calcined by means of a rotary kiln at 900° C. for 1 hour so that CAA of 40% at a final reaction rate at 22° C. fell in the range of from 120 to 140 to obtain a calcined magnesium oxide particle aggregate. Further, the calcined aggregate was ground using a hammer-type grinder at a hammer rotational frequency of 3,500 rpm and at a classifier rotational frequency of 3,000 rpm to prepare a magnesium oxide particle aggregate having a predetermined particle aggregation structure.

Example 2

A calcium hydroxide slurry was added to bittern so that the magnesium hydroxide concentration after reaction became 2 mol/kg, and the resultant mixture was stirred at 600 rpm to effect a reaction at 80° C. for 2 hours. Then, the reaction mixture was subjected to filtration by means of a filter press, and washed with water and dried, and the resultant magnesium hydroxide was calcined by means of a rotary kiln at 890° C. for 1 hour so that CAA of 40% at a final reaction rate at 22° C. fell in the range of from 120 to 140 to obtain a calcined magnesium oxide particle aggregate. Further, the calcined aggregate was ground using a grinder at a hammer rotational frequency of 3,500 rpm and at a classifier rotational frequency of 4,000 rpm to prepare a magnesium oxide particle aggregate having a predetermined particle aggregation structure.

Example 3

A calcium hydroxide slurry was added to magnesium chloride so that the magnesium hydroxide concentration after reaction became 1 mol/kg, and polyaluminum chloride was added thereto as a flocculant in an amount of 10 ppm, and the resultant mixture was stirred at 400 rpm to effect a reaction at 60° C. for 20 hours. Then, the reaction mixture was subjected to filtration by means of a filter press, and washed with water and dried, and the resultant magnesium hydroxide was calcined by means of a rotary kiln at 900° C. for 1 hour so that CAA of 40% at a final reaction rate at 22° C. fell in the range of from 120 to 140 to obtain a calcined magnesium oxide particle aggregate. Further, the calcined aggregate was ground using a grinder at a hammer rotational frequency of 3,200 rpm and at a classifier rotational frequency of 4,000 rpm to prepare a magnesium oxide particle aggregate having a predetermined particle aggregation structure.

Comparative Example 1

Bittern and calcium hydroxide were reacted with each other to form magnesium hydroxide, and the magnesium hydroxide was calcined by means of a rotary kiln at 950° C., and then placed in water and heated again to effect a reaction at 80° C. for 2 hours, followed by filtration and drying. The resultant magnesium hydroxide was calcined by means of a muffle kiln at an internal temperature of 1,200° C. to prepare magnesium oxide particles. The thus prepared particles are not controlled with respect to the particle aggregation structure as conducted in the present invention, but they are magnesium oxide for an annealing separator currently for a high performance grain-oriented magnetic steel sheet.

Comparative Example 2

Bittern and calcium hydroxide were reacted with each other at 40° C. for 10 hours to form magnesium hydroxide, and then the magnesium hydroxide was calcined by means of a rotary kiln at 1,050° C. to prepare magnesium oxide particles. The thus prepared particles are not controlled with respect to the particle aggregation structure as conducted in the present invention, but they are magnesium oxide for an annealing separator used for general magnetic steel sheets.

Comparative Example 3

Calcium hydroxide was added to sea water so that the magnesium hydroxide concentration after reaction became 0.05 mol/kg to effect a reaction at 50° C. for 20 hours, thus forming magnesium hydroxide. 5 Hours before completion of the reaction, anionic polyacrylamide was added in an amount of 200 ppm, and the reaction mixture after completion of the reaction was subjected to filtration by means of a filter press and dried. Then, the resultant magnesium hydroxide was calcined by means of a rotary kiln at 950° C. to prepare magnesium oxide particles. The thus prepared particles are not controlled with respect to the particle aggregation structure as conducted in the present invention, and they are magnesium oxide used in an application other than the annealing separator.

Table 2 shows the measurement results for particle aggregation structures of the particles or particle aggregates in Examples and Comparative Examples. As can be seen from the table, in each of Examples 1 to 3 in which the particle aggregate was produced while controlling the particle aggregation structures, the first inflection point diameter is very small and both the interparticle void volume and the particle void volume fall in the respective ranges defined in the present invention, and the reactivity in the solid phase reaction is essentially excellent. On the other hand, in each of Comparative Examples in which the particle aggregation structure was not controlled, the first inflection point diameter is larger than the upper limit of the range of the pore diameter defined in the present invention. Especially in Comparative Example 3 in which the particles are used in an application other than the annealing separator, the first inflection point diameter is very large. Further, the particles in Comparative Example 1 have a particle aggregation structure such that the interparticle void volume is lower than the lower limit of the range defined in the present invention, the particles in Comparative Example 2 have a particle aggregation structure such that both the interparticle void volume and the particle void volume are larger than the respective upper limits of the ranges defined in the present invention, and the particles in Comparative Example 3 have a particle aggregation structure such that the interparticle void volume is lower than the lower limit of the range defined in the present invention.

TABLE 2

| | First inflection point diameter $10^{-6}$ m | Particle porosity $10^{-3}$ m$^3$ kg$^{-1}$ | Interparticle void volume $10^{-3}$ m$^3$ kg$^{-1}$ |
|---|---|---|---|
| Example 1 | 0.12 | 0.61 | 1.99 |
| Example 2 | 0.28 | 0.69 | 1.45 |
| Example 3 | 0.20 | 0.59 | 1.85 |
| Comp. ex. 1 | 0.35 | 0.71 | 1.16 |
| Comp. ex. 2 | 0.35 | 0.84 | 2.63 |
| Comp. ex. 3 | 1.17 | 0.62 | 0.52 |

With respect to the above magnesium oxide particle aggregates or powder particles, the behavior of formation of a forsterite film was examined. It is presumed that the formation of forsterite proceeds according to the solid phase reaction: $2MgO+SiO_2 \rightarrow Mg_2SiO_4$. Therefore, a magnesium oxide powder and amorphous $SiO_2$ were mixed in a molar ratio of 2:1 to form a mixture, and the mixture was shaped under a pressure of 50 MPa to obtain a shaped article having a diameter of $15 \times 10^{-3}$ m and a height of $15 \times 10^{-3}$ m. Then, the shaped article was calcined in a nitrogen gas atmosphere at 1,200° C. for 4 hours. This calcination temperature corresponds to the temperature of the finishing annealing in which $SiO_2$ is reacted with a slurry containing magnesium oxide on the grain-oriented magnetic steel sheet. An X-ray diffraction analysis was conducted to quantitatively determine an $Mg_2SiO_4$ formation rate for the obtained sintered product. The results are shown in Table 3.

TABLE 3

| | $Mg_2SiO_4$ formation rate (mass %) |
|---|---|
| Example 1 | 90.6 |
| Example 2 | 93.2 |
| Example 3 | 91.8 |
| Comp. ex. 1 | 89.6 |
| Comp. ex. 2 | 77.5 |
| Comp. ex. 3 | 63.4 |

As can be seen from Table 3, in each of Examples 1 to 3, the forsterite formation rate exceeds 90%, and thus excellent effect of the magnesium oxide particle aggregate having a particle aggregation structure controlled with respect to the first inflection point diameter and the particle void volume as well as the interparticle void volume is achieved. In addition, it is apparent that the forsterite formation rate in each of Examples 1 to 3 is higher than that of the magnesium oxide in Comparative Example 1, which is currently used as an annealing separator for a high-grade grain-oriented magnetic steel sheet. Further, the forsterite formation rate of the magnesium oxide in Comparative Example 2 used as a general annealing separator and that of the magnesium oxide in Comparative Example 3 used in an application other than the annealing separator are very small.

Next, magnesium oxide was applied to a magnetic steel sheet to examine the properties of a forsterite film. A silicon steel slab for a grain-oriented magnetic steel sheet, which slab comprises C: 0.058%; Si: 2.8%; Mn: 0.06%; Al: 0.026%; S: 0.024%; N: 0.0050% (in terms of % by mass); and the balance of unavoidable impurities and Fe, was hot-rolled, pickled with an acid and cold-rolled by known methods to Obtain the final sheet thickness of 0.23 mm, and followed by decarburization annealing in a wet atmosphere comprised of 25% of nitrogen gas and 75% of hydrogen gas.

The magnesium oxide particle aggregates of the present invention and the magnesium oxide particles in Comparative Examples, each in a slurry form, were individually applied to the above steel sheet so that the dried coating weight became 12 g/m$^2$, and dried and then, subjected to final finishing annealing at 1,200° C. for 20 hours. The forsterite films formed on the steel sheets are shown in Table 4.

TABLE 4

| | State of glass film formed | Evaluation |
|---|---|---|
| Example 1 | Uniform and thick | ◎ |
| Example 2 | Uniform and thick | ◎ |
| Example 3 | Uniform and thick | ◎ |
| Comp. ex. 1 | Uniform and slightly thin | ○ |
| Comp. ex. 2 | Nonuniform and slightly thin | Δ |
| Comp. ex. 3 | Nonuniform and very thin | X |

As can be seen from Table 4, the forsterite films formed from the particle aggregates in Examples 1 to 3 are those having a uniform and satisfactory thickness. Particularly, it is apparent that the particle aggregates in Examples 1 to 3 form a forsterite film having an appropriate thickness and are excellent annealing separators, as compared with the magnesium oxide particles in Comparative Example 1 which are currently used as an annealing separator for a high-grade grain-oriented magnetic steel sheets.

INDUSTRIAL APPLICABILITY

As mentioned above, in the present invention, there can be provided magnesium oxide having a particle aggregation structure which can advantageously form forsterite. In addition, the magnesium oxide particle aggregate of the present invention exhibits high forsterite formation rate, as compared with the magnesium oxide currently used as an annealing separator for a grain-oriented magnetic steel sheet. Therefore, the grain-oriented magnetic steel sheet obtainable by a treatment using the magnesium oxide of the present invention has satisfactory magnetic properties as a grain-oriented magnetic steel sheet. Further, the technical concept of the present invention can be applied not only to the annealing separator but also to other solid phase reactions, for example, ceramic synthesis.

What is claimed is:

1. A magnesium oxide particle aggregate having a first inflection point diameter of $0.30 \times 10^{-6}$ m or less, an interparticle void volume of $1.40 \times 10^{-3}$ to $2.20 \times 10^{-3}$ m$^3$/kg and a particle void volume of $0.55 \times 10^{-3}$ to $0.80 \times 10^{-3}$ m$^3$/kg in a cumulative intrusion volume curve of said particle aggregate.

* * * * *